United States Patent [19]
Kantola et al.

[11] 3,817,303
[45] June 18, 1974

[54] TREE CROSSCUTTING DEVICE, IN PARTICULAR FOR FELLING GROWING TREES

[76] Inventors: Mikko Kantola, Haukitie 6, 02170 Haukilahti; Paavo Haataja; Pentti Saarinen, both of 05200 Rajamaki, all of Finland

[22] Filed: Jan. 10, 1973

[21] Appl. No.: 322,282

[30] Foreign Application Priority Data
Jan. 13, 1972 Finland.................................. 84/72

[52] U.S. Cl.............................................. 144/34 R
[51] Int. Cl............................................ A01g 23/08
[58] Field of Search ........................ 144/34 R, 34 E

[56] References Cited
UNITED STATES PATENTS

| | | | |
|---|---|---|---|
| 1,509,994 | 9/1924 | Carroll | 144/34 R |
| 3,294,131 | 12/1966 | Larson | 144/34 E |
| 3,461,929 | 8/1969 | Hunger et al. | 144/34 R |
| 3,540,501 | 11/1970 | Jonsson | 144/34 E |
| 3,690,353 | 9/1972 | Johnston | 144/34 R |
| 3,720,248 | 3/1973 | Mellgren | 144/34 R |
| 3,720,249 | 3/1973 | Peltonen | 144/34 E |

Primary Examiner—Gerald A. Dost
Attorney, Agent, or Firm—Richards & Geier

[57] ABSTRACT

A tree crosscutting device, in particular for felling growing trees, for attachment to a tractor or equivalent, having two cutting bits which enter the wood from opposite directions, urged by attached action means. The bits are turnably mounted on the body structure of the device, and the invention is particularly characterized in that their turning axis is common to both and parallel with the principal straight line passing through the opposite extreme points of their cutting edges, and carried in a journalling pivot. Furthermore, the cutting bits are shaped to conform to part of a double cone, the central axis of which coincides with said turning axis. Thereby, the cutting edge presents a V-shaped ridge, which promotes the splitting of the tree stump and reduces the penetration resistance of the cutting bits.

Additional, optional characteristics specify various details concerning the geometry of the cutting bits and their V-ridge. A wedge, additional to the cutting bits proper, is also specified and described in some detail, as well as details of the cutting bit holders and of the journalling arrangements associated with the common axis of the cutting bits.

7 Claims, 9 Drawing Figures

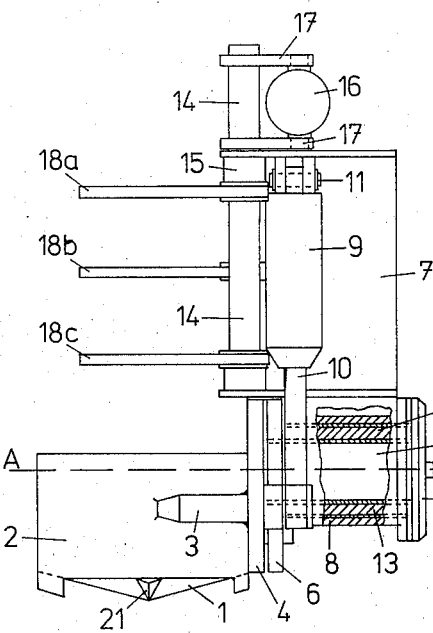
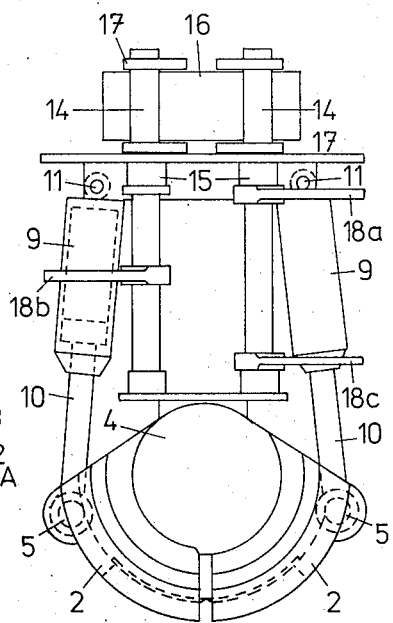
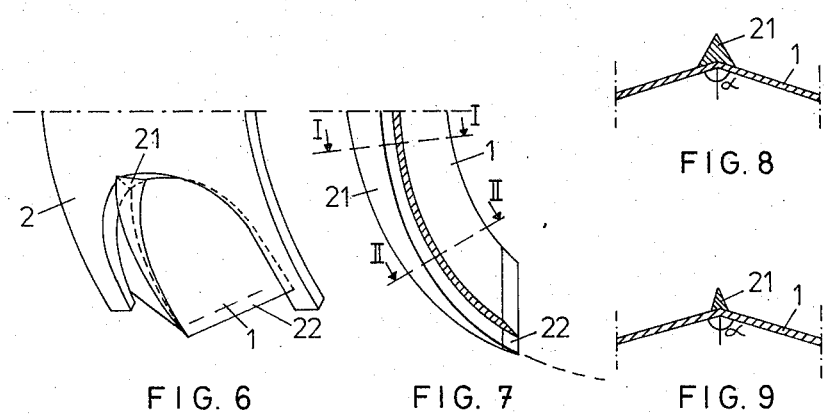

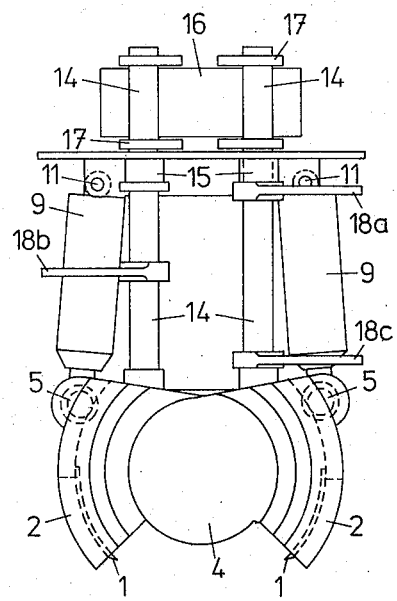
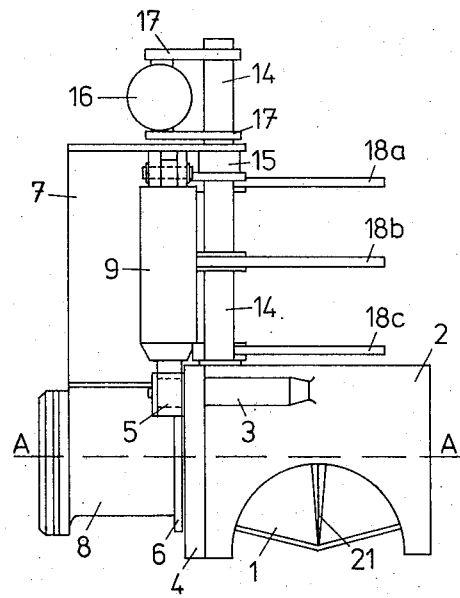
FIG. 3    FIG. 4
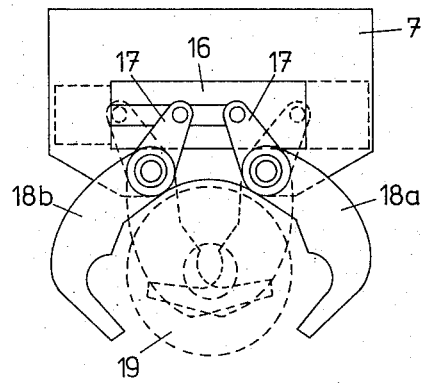
FIG. 5

TREE CROSSCUTTING DEVICE, IN PARTICULAR FOR FELLING GROWING TREES

The present invention concerns a tree crosscutting device, in particular one for felling growing trees, consisting of a body structure of the crosscutting device for attachment to the body structure or articulated or telescopic jib of a tractor or universal machine and of two cutting bits entering the wood from opposite directions with action means, which cutting bits have been connected with the body structure of the crosscutting device to be turnable by means of their action means, the turning axis in question being parallell with the principal straight line passing through the opposite extreme points of the cutting edges of the cutting bits.

Endeavours have been made to replace the tree felling by motor saw, which requires a great amount of human labour and is a heavy and, owing to the vibration of the motor saw, unhealthy work phase, by cutting or other felling devices which can be governed from the working machine. The diminution of raw material resources for the wood conversion industry has emphasized the greatest possible economy in recovering the wood that grows. Such felling devices have therefore been developed which cut the tree in a downwardly oblique direction, in order that as little wood matter as possible might be left in the stump. The advantages of these devices in comparison with, for instance, those felling devices which cut in shear or wedge fashion at right angles to the wood fibres include, in addition to more perfect wood matter recovery than before, also the fact that with the oblique direction of the bits the cutting resistance becomes lower and the splitting of the butt bolt is reduced.

The aim of the present invention is further development of the crosscutting devices disclosed in the above-mentioned patent applications so that such drawbacks are avoided which have been observed in them and a crosscutting device is obtained which is more simple of its design and more reliable in operation than those of prior art. Among the drawbacks in question, the difficulties may be mentioned which are encountered in positioning the tree between the cutting bits and equally with reference to all bits so that a symmetrical cutting motion is achieved. Furthermore, said devices of prior art are necessarily heavy, awkward and complicated in practice.

Furthermore, according to the U.S. Pat. No. 3,540,501 (Brundell and Jonsson AB, Sweden) a device for cross-cutting tree trunks is known which comprises two bit tools, each composed of a bit-shaped knife, and wherein the turning axis of the bit tool forms an angle having a magnitude not more than 70° with the principal direction of both cutting edge lines. Parallelity of the bit turning axis and the principal cutting edge line has been observed, in said patent, to be theoretically the most advantageous, but owing to the problems caused by such an arrangement it has been considered that it cannot be employed. Said problems have found a solution in the present invention.

From the U.S. Pat. No. 3,461,929 (Beloit Corporation, U.S.A.) a tree crosscutting device is previously known which has two opposed cutting bits turnably carried on separate shafts, which are substantially horizontal and horizontally spaced by a given distance. The cutting bits are shaped as cylinder surfaces, one having a larger radius of curvature than the other, because owing to the horizontal distance of the turning axes the cutting edges of the cutting bits cannot meet at the final stage of the crosscutting operation. In the crosscutting device according to said patent the cutting bits are, in fact, compelled to turn somewhat upwardly from the horizontal direction at the final phase of cutting, which for its part contributes to make the wood penetration resistance and power requirement of the device rather high. Owing to the substantially horizontal principal direction of the cut, an appreciable amount of usable wood material is still left in the stump. Furthermore, the fairly large horizontal distance between the turning axes of the cutting bits makes the device comparatively bulky in the lateral direction.

The drawbacks revealed above are avoided, and the aims of the invention are achieved, in a tree crosscutting device mainly characterized in that both cutting bits turn in a manner previously known in itself about one and the same turning axis, in a journalling pivot, and that the cutting bits have such shape that they are located on a part of the mantle of a double cone having its central axis coincident with said turning axis, whereby substantially at the centre of the cutting bits a V-shaped ridge transversal to the cutting edge is formed, which promotes the splitting of the stump when a growing tree is being felled, thus reducing the penetration resistance of the cutting bits.

It is thus understood that the point in which the present invention substantially differs e.g., from the device according to the above-mentioned U.S. Pat. No. 3,540,501 is that the turning axis of the cutting bits is parallell with the principal direction of the cutting edge of the bits, whereby the angle occurring according to said patent is not formed at all. In the device according to the invention, the front edge as well as rear edge of both cutting bits move along paths which are homothetic and have substantially equal radius. Hereby, furthermore, the advantage is gained, compared with said U.S. Pat. No. 3,540,501, that when the cutting bits draw apart the free space into which the butt end of the tree to be felled is guided, is equally wide on both sides, whence follows that a given length of travel of the edge of the cutting bit suffices to fell a thicker tree than is the case with a device according to said patent.

The present invention differs from the crosscutting device disclosed in the U.S. Pat. No. 3,461,929, firstly, in that according to the invention both cutting bits turn about the same turning axis, whereas in the device of said patent the turning axes of the bits are spaced by a considerable horizontal distance. Furthermore, the shape of the cutting bits is different: those according to the said patent are parts of a cylinder surface and have different radii of curvature, whereas in the present invention the bits have a shape consistent with part of a double cone mantle and they are mutually substantially identical.

The following advantages are gained by the present invention, compared with the devices of prior art known from the publications cited above:

Owing to the shape of the bit, the wood-penetrating resistance of the bits is reduced, and this may further be augmented by means of a wedge-shaped piece;

When a turning axis common to both bits is used, both bits may be completely identical, whereby the manufacturing costs are lowered; the space required by the device in the horizontal plane is reduced at least by the horizontal distance of the previously employed turning axes; the bits may be made to have a radius of curvature smaller than before, whereby even more wood matter is recovered, which previously was left in the stump; and the wood penetration resistance of the bits becomes smaller than before; the bits can be journalled on a common, sturdy shaft by the aid of sleeve-like structures, which for its part simplifies the design and makes it less expensive; and the bit has a simple shape and is easy to manufacture compared, for instance, with the cup-resembling cutting bit of the U.S. Pat. No. 3,540,501.

The invention is described in detail with reference to the embodiment example illustrated by the attached drawing, but to which the invention is in no way confined.

FIG. 1 shows in elevational view and partly in section, a felling device according to the invention with the cutting bits in that position wherein the cutting motion has been completed and the opposed cutting bits meet.

FIG. 2 shows the same as FIG. 1, viewed from a direction from which the tree enters the space between the space between the cutting bits.

FIG. 3 shows the felling device, viewed from the same direction as in FIG. 2, but with the cutting bits in the opened position in this figure.

FIG. 4 shows the same as FIG. 1, viewed from the side.

FIG. 5 shows the felling device, viewed from above.

FIG. 6 is an axonometric drawing of the cutting bit and of part of its holder.

FIG. 7 shows a non-central cross section of the cutting bit.

FIG. 8 shows the section, in principle, along the line I—I of FIG. 7.

FIG. 9 similarly shows the section, in principle, along the line II—II in FIG. 7.

The cutting bits 1, having the shape of part of a double cone, are mounted in bit holders 2 of a sturdy construction, which have a cut-out substantially shaped like a circular segment, for the part of the cutting bit 1 which cuts the wood. To the bit holders 2 short arms 3 have been attached, which in their turn are affixed, together with the lateral margin of the bit holder 2, to circular flanges 4 and 6, respectively. To one of said flanges, 4, a sturdy shaft 12 has been affixed, which is perpendicular and central to the flange 4, and upon this shaft a sleeve 13 affixed to the other flange 6 is carried so that a journal 8 is formed, which is securely attached to the body structure 7 of the felling device.

It is an essential feature of the invention that in the journal 8 described above, the axis A—A about which the cutting bits turn is parallell with the principal direction of the cutting edge 22 of both cutting bits 1, that is the axis A—A is parallell with a straight line imagined to pass through the opposite extreme points of the cutting edge 22 on both cutting bits 1. By this design a simple shape is obtained for the cutting bit, which furthermore endows the cutting bits 1 with a low wood penetration resistance.

The continuation of the arms 3 constitutes the pin of a pivot 5, to which pivot the piston rod 10 of a power cylinder 9 has been attached. The other end of the power cylinder 9 is attached to the body structure 7 of the felling device by means of a pivot 11. The stroke length of the power cylinders 9 has been dimensioned to be such that in one extreme position of their pistons (FIG. 3) the tree to be felled can enter the space between the cutting bits 1 and in the other end position (FIG. 2) the edges 22 of the cutting bits 1 meet, whereby the cutting for felling the tree has been completed.

In order to grab the tree to be felled and to centre it between the cutting bits 1, the felling device has been provided with grabbing arms 18a, 18b and 18c, which are welded to a shaft 14 turnable in the bearing 15, there being two such shafts vertically disposed and the grabbing arm 18b being affixed to one of them and grabbing arms 18a and 18c to the other, all three arms vertically spaced by a given distance. At their ends, the shafts 14 carry arms 17 connected e.g., with a hydraulic turning means 16, by action of which the grabbing arms 18 are turnable from the open extreme position, shown by solid lines in FIG. 5, into their closed extreme position (dotted lines) and vice versa.

FIGS. 6 to 9 display the shaping of the cutting bits 1 in greater detail. It is an essential feature of the invention that both cutting bits are located on part of the mantle of a double cone so that the central axis of this double cone coincides with the turning axis A—A of the cutting bits 1. Hereby at the centre of the cutting bit 1 a V-shaped ridge is formed so that the radius of curvature of the profile of the cutting bit 1 in the vertical plane decreases on both sides of said ridge in the direction towards the margin of the cutting bit 1. An appropriate range for the angle α of said V-ridge (FIGS. 8 and 9) is between 90° and 160°. By the shaping of the cutting bits 1 just described and by the V-ridge a wedge action splitting the stump of the tree is achieved, whereby it has been possible to reduce the wood penetration resistance of the cutting bits 1 quite appreciably. It is possible, if required, to enhance the splitting wedge action of the V-ridge by means of a curved wedge 21 affixed to said ridge on its convex side, a more detailed example of the design of this wedge 21 being seen in FIGS. 6 to 9. The use of the wedge 21 results in the advantage that the pressure acting on the cutting bits, owing to splitting of the stump, is substantially reduced. It follows that the cutting bits 1 can be made of steel of greater thickness, which is a considerable advantage because previously difficulties have been encountered in achieving sufficient strength of the cutting bits, since any increase of the material thickness of the cutting bits has caused a powerful increase of the resistance to the penetration of the bits into the wood. As can be seen from FIGS. 6 to 9, the wedge 21 is preferably pyradimally wedge-shaped and narrowing towards the edge 22 of the cutting bit 1.

The operation of a felling device according to the invention is, for instance, as follows. The felling device, attached to the end of an articulated or telescopic jib, is made to approach the butt portion of the trunk 19 of the tree to be felled (FIG. 5), with its cutting bits 1 and grabbing arms 18 in the open position, so that the trunk 19 is positioned between the cutting bits and the grabbing arms 18. The grabbing arms 18 are closed to be closely adjacent to the surface of the tree trunk and the device is lowered so that the cutting bits 1 come to lie close to the ground. The grip of the grabbing arms 18 on the tree trunk is tightened, whereby owing to the shaping of the grabbing arms 18 the device is centred so as to bring the tree trunk 19 to the centre between the cutting bits. Hereafter, the tree may be pressed in two by means of the cutting bits 1. The direction in which the tree falls can be determined by the aid of a tilting cylinder, which has been omitted from the figures. Since the felling device has no parts sensitive to damage on the side of the cutting bits 1, the felling device is left clamped to the butt end of the falling tree, whereby it is easy to lift the butt end of the tree to any desired place, e.g., onto the skidding bank of a transporting machine, or to the feed station of a pruning machine, where the butt end is set free from the felling device.

We claim:

1. Tree crosscutting device, in particular for felling growing trees, comprising a body structure which is attached to an articulated or telescopic jib of a tractor or universal machine, two cutting bits with cutting edges entering the wood from opposite directions, which cutting bits have been connected with said body structure to be turnable by means of power means about a turning axis, which is parallel with the principal straight line passing through the opposite extreme points of said cutting edges, characterized in that both cutting bits are turnable about one and the same turning axis, in a journalling pivot, and that the cutting bits have such shape that they are located on a part of the mantle of a double cone having its central axis coincident with said turning axis, whereby substantially at the centre of the cutting bits a V-shaped ridge transversal to the cutting edge is formed, which promotes the splitting of the stump when a growing tree is being felled, thus reducing the penetration resistance of the cutting bits.

2. Tree crosscutting device according to claim 1, characterized in that on the cutting bits the angle formed by said V-shaped ridge is in the range from 90° to 160°.

3. Tree crosscutting device according to claim 1, characterized in that said V-shaped ridge is perpendicular to the cutting edge of the cutting bits, and that said V-ridge meets the edge substantially at its centre.

4. Tree crosscutting device according to claim 1, characterized in that in connection with said V-ridge a wedge has been affixed, having the purpose of promoting the splitting of the stump and reducing the wood penetration resistance of the cutting bit.

5. Tree crosscutting device according to claim 4, characterized in that the wedge is pyramidally narrowing in the direction towards the cutting edge of the cutting bit.

6. Tree crosscutting device according to claim 1, characterized in that the cutting bits have been mounted in bit holders having cut-outs substantially shaped like a circular segment for the part of the cutting bits penetrating into the wood.

7. Tree crosscutting device according to claim 1, characterized in that the cutting bits have been affixed by mediation of bit holders to flanges, to one of which a shaft central to the turning axis has been affixed, upon which shaft there is a sleeve affixed to the other flange, upon which sleeve there is a sleeve forming a journal and which has been affixed to the body structure of the crosscutting device.

* * * * *

UNITED STATES PATENT OFFICE
CERTIFICATE OF CORRECTION

Patent No. 3,817,303          Dated June 18, 1974

Inventor(s)  Mikko Kantola et al.

It is certified that error appears in the above-identified patent and that said Letters Patent are hereby corrected as shown below:

On the cover sheet insert

-- [73] Assignee: Tyotehoseura ry, Helsinki, Finland --.

Signed and sealed this 29th day of October 1974.

(SEAL)
Attest:

McCOY M. GIBSON JR.                    C. MARSHALL DANN
Attesting Officer                       Commissioner of Patents